United States Patent [19]
Carrier et al.

[11] Patent Number: 6,126,115
[45] Date of Patent: Oct. 3, 2000

[54] APPARATUS FOR RETAINING AND RELEASING A PAYLOAD

[75] Inventors: Alain Carrier, Millbrae; Bruce Cobb, Fremont, both of Calif.

[73] Assignee: Lockheed Martin Corporation, Sunnyvale, Calif.

[21] Appl. No.: 08/781,359

[22] Filed: Jan. 21, 1997

[51] Int. Cl.[7] .................................................. B64G 1/64
[52] U.S. Cl. ........................ 244/158 R; 244/137.4; 244/161; 294/86; 294/82.24
[58] Field of Search ............................... 244/158 R, 161, 244/173, 137.4; 294/82.26, 100, 82.24, 86.24, 99.1; 60/520; 411/909

[56] References Cited

U.S. PATENT DOCUMENTS

| | | |
|---|---|---|
| 4,715,637 | 12/1987 | Hosoda et al. . |
| 4,887,430 | 12/1989 | Kroll et al. . |
| 4,900,078 | 2/1990 | Bloch . |
| 4,929,135 | 5/1990 | Delarue et al. . |
| 5,020,842 | 6/1991 | Miwa et al. . |
| 5,040,748 | 8/1991 | Torre et al. . |
| 5,095,595 | 3/1992 | Stella et al. .............................. 24/603 |
| 5,160,233 | 11/1992 | McKinnis . |
| 5,407,243 | 4/1995 | Riemnann . |
| 5,702,069 | 12/1997 | Geyer et al. . |

*Primary Examiner*—Peter M. Poon
*Assistant Examiner*—T. Dinh
*Attorney, Agent, or Firm*—Law Offices of Terry McHugh

[57] ABSTRACT

An apparatus for latching an object, such as a payload for a space vehicle, includes an expandible latch which is shifted between a relaxed open condition and a flexed closed condition by actuation of a pair of temperature-responsive members, such as shaped memory alloy (SMA) coil springs. One of the two temperature-responsive members biases an actuator into a first position that allows the expandible latch to open. The other SMA member biases the actuator in the opposite position to close the expandible latch. Heating the appropriate SMA member causes the actuator to move from one position to the other position. In the preferred embodiment, no power is required to maintain the actuator in either position once the position has been established. For example, the actuator may have a rest position that allows the expandible latch to remain open when the two SMA members are cooled and allowed to reach an equilibrium condition with respect to applied force to the actuator. A detent-and-ball arrangement may be used to maintain the position of the actuator after the expandible latch has been closed.

20 Claims, 5 Drawing Sheets

FIG_1
PRIOR ART

FIG_2

FIG_3

FIG_7

FIG_8

APPARATUS FOR RETAINING AND RELEASING A PAYLOAD

STATEMENT OF GOVERNMENT RIGHTS

The invention described herein with the limitations provided by claim 1, claim 3 through claim 17, claim 19, and claim 20 was made in the performance of work under a NASA Contract No. NAS530682 (Subcontract No. S9440025) and is subject to the provisions of Section 305 of the National Aeronautics and Space Act of 1958 (42 U.S.C. 2457). The additional limitations described by other claims are not subject to the 42 U.S.C. provisions.

TECHNICAL FIELD

The invention relates to apparatus for controllably retaining and releasing an object, such as a payload of a space vehicle.

BACKGROUND ART

Satellites, launch vehicles and other spacecrafts are often equipped to support a payload having more than one mission mode. For example, a satellite is carried into space in a transport mode by a launch vehicle for release in a suitable orbit about the earth, allowing the satellite to enter an operational mode. One or more mechanical devices may be used to retain the satellite to the launch vehicle until the release point is reached. The mechanical devices are then controlled to release the satellite for separation from the launch vehicle.

Another application relates to latch devices for use in the space industry to provide a temporary release. A payload of a satellite may require the payload to be non-rigidly mounted ("softly mounted") to the body of the satellite when in the operational mode, while it may be necessary or beneficial to rigidly mount the payload to the satellite body when not in the operational mode. For example, the payload may be an optical space instrument that is used for weather imaging or the like. During an imaging operation, latch devices may release the optical space instrument for support by soft mount devices that allow the instrument to move relative to the satellite body. The optical space instrument is then isolated to some extent from mechanical vibrations of the satellite body, and is therefore in a better performance environment. On the other hand, the optical space instrument is preferably rigidly mounted to the satellite body during launch and during on-orbit events that potentially could damage softly mounted payloads. Accordingly, a spacecraft may be equipped with both soft mount devices and resettable rigid mount latches to accommodate the various modes of payload operations.

Another advantage of a resettable latch for use in the space industry is that the controllable latches facilitate testing procedures on the ground. Prior to launch, a satellite and its optical payloads will undergo numerous tests. The tests may be conducted at various sites, requiring the optical payload to be rigidly mounted to the satellite body during transportation from one site to another. A resettable and controllable latch device may be used to lock the payload in place during transportation and to release the payload for a test procedure.

Figure 1:
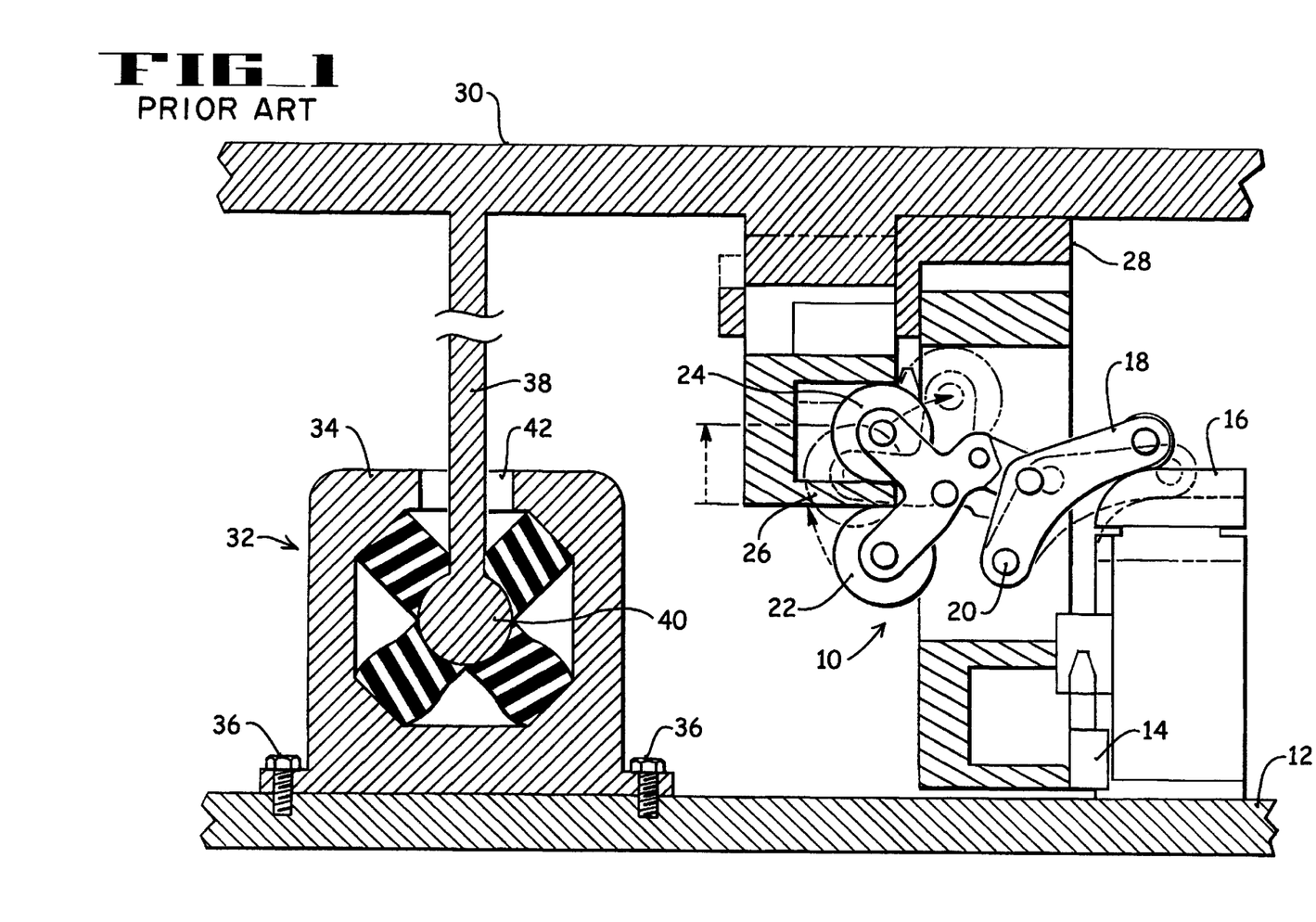
FIG. 1 is a side partially sectional view of a prior art latching assembly.

Conventional controllable latch devices are hydraulically, pneumatically or electromechanically driven. Such devices are well known in various industries, including the space industry. In FIG. 1, a solenoid-driven latch 10 is shown mounted to a platform 12. The latch is shown in solid in a locked condition and is shown in phantom in a release condition. A solenoid 14 raises and lowers a bearing member 16 to pivot an arm 18 about a pivot point 20. In the raised position shown in solid, the arm 18 lowers a pair of pinch wheels 22 and 24 to trap a flange 26 between the pinch wheels. The flange 26 is a portion of a bracket 28 connected to a payload 30. Thus, the payload is fixed in position when the arm 18 is in the raised position and secures the flange 26 between the pinch wheels 22 and 24. The solenoid 14 is selectively retracted to lower the bearing member 16. The arm 18 pivots about the pivot point 20 to the lower position shown in phantom. In response, the pinch wheels pivot upwardly to the position shown in phantom and the flange 26 is released. In this condition, the payload 30 is allowed to move to a limited extent by a soft mount device 32. The soft mount device includes a stationary frame 34 connected to the platform 12 by bolts 36. A payload interface 38 includes a spherical end 40 that is free to rotate within the soft mount device 32 to a limited extent. The maximum deflection of the payload interface may be limited by the dimensions of an opening 42 through which the payload interface passes, or may be limited by some other means not shown.

One concern with the prior art structure shown in FIG. 1 is that a soft mount device 32 that is maintained in a deflected condition for an extended period of time will often take a permanent set in the deflected condition. Another concern is that the latch 10 may be inadvertently back-driven from the locked condition to the release condition shown in phantom. When the latch is in the locked condition, excessive vibrations or a properly directed impact with the payload 30 may cause the flange 26 to pull the upper pinch wheel 24 upwardly with a force that is sufficient to cause the payload to be unintentionally released from the locked condition.

While hydraulically driven, pneumatically driven, and electromechanically driven latch devices are conventionally used, other means for capturing or retaining an object are known. U.S. Pat. Nos. 4,900,078 to Bloch and 5,095,595 to Stella et al. describe capture devices using a shape memory alloy material in space applications.

The Bloch patent describes a gripping device having a pair of jaw bars that are parallel to each other and move toward and away from each other to grasp and release an object. An axially movable actuator bar is connected to the jaw bars by four link members. Each link member is pivotally attached to the actuator bar at one end and pivotally connected to the jaw bars at the opposite end. The pivotal links bring the jaw bars together or further apart depending upon the motion of the actuator bar. The movement of the actuator bar is induced by heating a wire formed of a shape memory alloy, such as a nickel-titanium alloy that contracts when heated. The wire is connected to the actuator bar to move the actuator bar in a given direction when the wire is heated beyond its martensitic critical temperature. When no heat is applied to the wire, a returning mechanism moves the actuator bar in the opposite direction.

Stella et al. describe a latch mechanism that uses a strip of copper-based shape memory alloy as an actuator element. When the actuator element is heated, it bends and pushes a cam member. The cam member rotates a lever to deploy a payload, such as an antenna reflector or solar array. Cooling the actuator element returns it to its normal straight position.

Another actuator that uses the shape memory effect is described in U.S. Pat. No. 4,887,430 to Kroll et al. The patent does not present a latch mechanism, but does describe a pair of shape memory alloy springs on the opposite sides of an actuator member for moving the actuator member in opposite directions. A detent retainer may be used to mechanically hold the actuator member once the desired position is reached.

While the prior art devices that utilize the shape memory effect function well under normal circumstances, these devices share the inadvertent-backdrive concern with electronically driven and hydraulically/pneumatically driven devices. That is, many of these devices are susceptible to the actuator being inadvertently switched from one position to another position by vibration or impact.

What is needed is a latch apparatus that is lightweight, resettable and programmable, with the apparatus preferably being highly resistant to switching between modes as a result of vibrations or impact.

SUMMARY OF THE INVENTION

A latching apparatus for retaining and releasing an object includes an expandable latch that is controlled by the position of an actuator which is positively pressured in opposite directions by a pair of shape memory alloy (SMA) members. In the preferred embodiment, the expandable latch is a flexure having a relaxed open condition and a flexed capture condition. In this embodiment, the SMA members are opposed compressed coil springs that are in equilibrium when the SMA members are in a cooled soft state and the actuator is in a position to allow the flexure to remain in the open condition. The flexure is shifted to the closed condition when the appropriate SMA member is heated beyond a transition temperature that significantly stiffens the coil spring to initiate actuator movement.

The flexure may be formed of an array of fingers, with each finger having a fixed end and a working end connected by a shank. For example, there may be four fingers. Allowing the flexure to relax from the capture condition to the open condition provides a radial expansion at the working ends of the fingers. The interior surfaces of the working ends combine to define a configuration suitable for firmly caging an object of interest. For example, the object may be a payload interface having a spherical end and the interior contact surfaces of the working ends of the fingers may be arcuate to generally define a sphere when the flexure is in the flexed capture condition. For applications in which the latching apparatus is to be used in combination with one or more soft mount devices that allow limited freedom of movement, the open condition may be such that the payload interface is not able to completely exit the flexure. This permits the payload interface to move within the flexure, while maintaining the payload interface in a position to be recaptured by the apparatus.

The movable actuator is in bearing engagement with the exterior surface of the flexure. In the preferred embodiment, the exterior surface of the flexure is tapered and movement of the actuator provides a wedge action. For example, the actuator may ride along an interior surface of an annular housing and contact the exterior surfaces of the flexure fingers. The wedge action presses the fingers inwardly to cage the object of interest.

As previously noted, the apparatus preferably includes a pair of SMA members. One SMA member biases the actuator in a direction to close the flexure, while the other SMA member biases the actuator to open the flexure. With both SMA members at a temperature below the transition temperature associated with the material, an equilibrium condition is reached in which the actuator is positioned for the flexure to be opened. However, heating a first SMA member beyond its transition temperature induces the actuator to move relative to the flexure and closes the flexure so as to capture the object of interest.

The latching apparatus is equipped with a mechanism for releasably holding the actuator in this position regardless of the temperature of the first SMA member. In one embodiment, the holding mechanism is a detent-and-ball arrangement that provides a force to overcome the bias of the second SMA member until the second SMA member is heated beyond its transition temperature. Consequently, the object of interest remains secured in position after the first SMA member is cooled. The actuator is dislodged only upon heating of the second SMA member.

An advantage of the invention is that the latching apparatus is programmable. The movement of the actuator to open and close the flexure may be time-triggered or event-triggered, for example. Another advantage is that the apparatus is easily and efficiently moved between the open and closed conditions. The latching apparatus is lightweight and durable. Most prior art latch actuation mechanisms are based on electric motors and magnetic devices. These actuation mechanisms operate well for their intended purposes, but have drawbacks related to their mass and size, which are very important parameters in space applications. Moreover, many of the prior art latch actuation mechanisms have exhibited poor performance when a relatively high actuation force is required to latch or release a payload. The present invention provides a compact, lightweight and high-force latch actuation mechanism.

Another advantage is that the geometry of the apparatus provides a low susceptibility to the apparatus inadvertently being shifted between the open and closed conditions. When the apparatus is in the open condition, the actuator is shielded from external forces that might induce movement of the actuator. In the closed condition, the preferred embodiment places the captured object of interest and the flexure in coaxial alignment, and places the actuator-to-flexure contact at the same level as the contact with the object of interest. Consequently, any external or inertial force acting upon the object of interest is reacted either axially in the flexure or normally to the actuator contact surfaces. The reacted forces therefore do not have any component having a tendency to drive the actuator from its position. As a result of the geometry, the apparatus is well suited for high load latching applications.

BEST MODE FOR CARRYING OUT THE INVENTION

Figure 2:
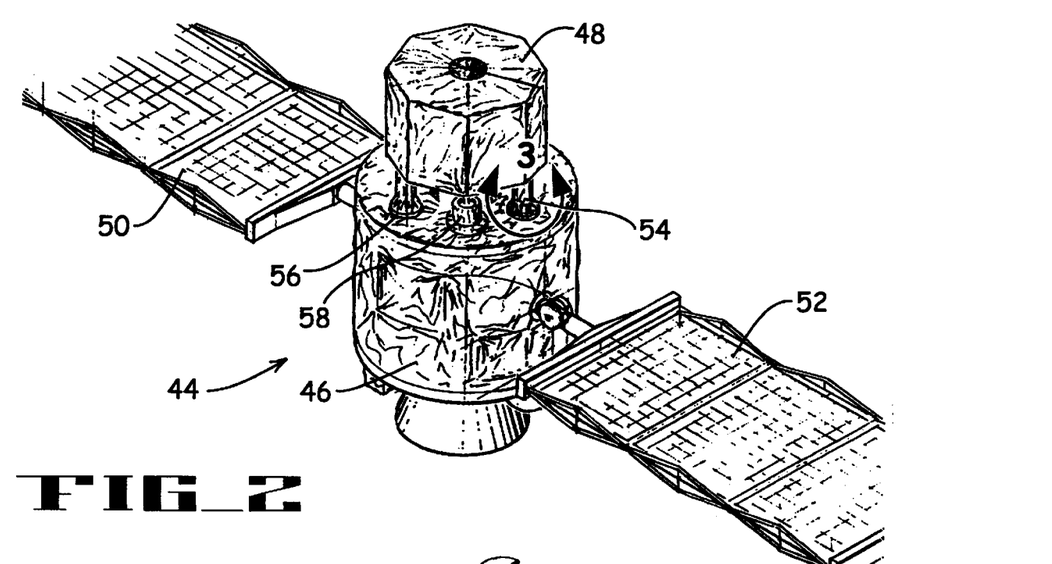
FIG. 2 is a perspective view of a satellite having a payload that is releasably connected to a satellite body utilizing a latching apparatus in accordance with the invention.

With reference to FIG. 2, a satellite 44 is shown as including a satellite body 46, an optical payload 48, and a pair of solar panels 50 and 52. With the exception of the attachment of the optical payload 48 to the satellite body 46, the satellite is a conventional structure and is not critical to the invention. The latching assembly which will be described below is designed for use in the space industry, but can be used in other applications.

Figure 3:
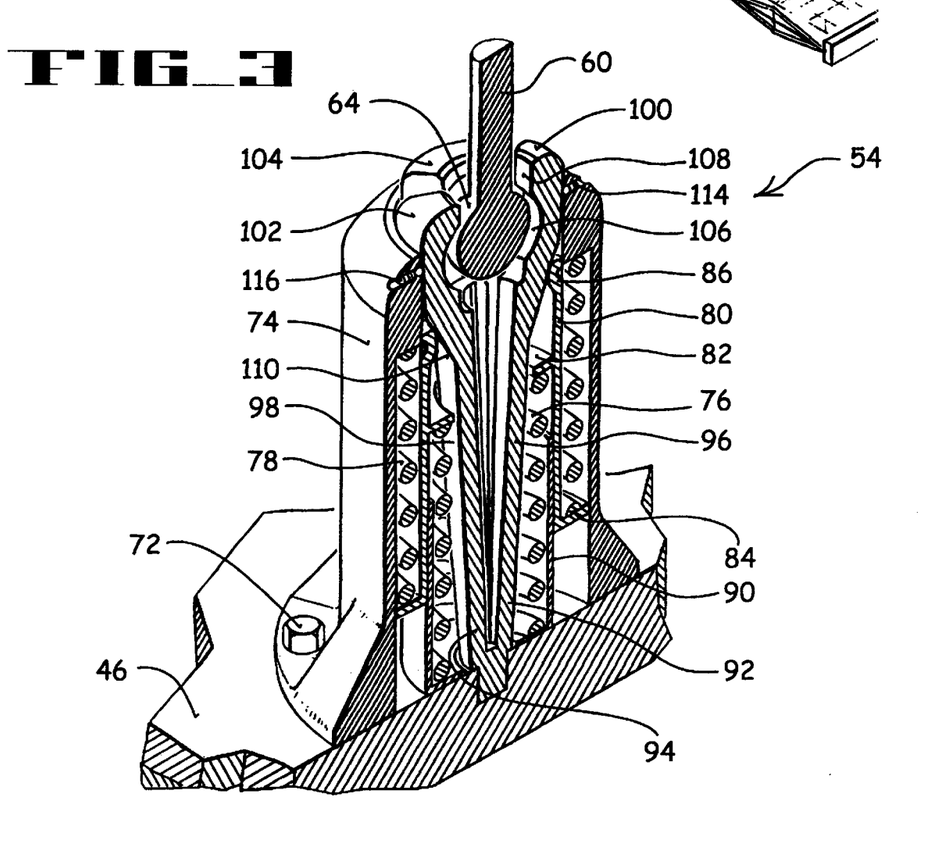
FIG. 3 is a perspective cutaway view of the latching apparatus of FIG. 2.

The optical payload 48 is releasably secured in a fixed position by latch actions at three separate locations, but only a first latching apparatus 54 and a second latching apparatus 56 are visible in FIG. 2. A perspective cutaway view of the first latching apparatus 54 is shown in FIG. 3. In addition to the selective latching of the payload 48 to the satellite body 46, the payload is secured to the satellite body by three soft mount devices 58, only one of which is visible in FIG. 2. Soft mount devices are well known in the art and are not critical to the invention. Optical payloads, such as weather monitoring instruments, must be tightly secured to a launch vehicle during launch, but benefit from being softly mounted during on-orbit operation. Soft mounting at least partially isolates the optical payload 48 from the mechanical vibrations of the satellite body 46. "Soft mount" is defined herein as an attachment of one object to another object in a manner that allows limited relative movement between the two objects. In the application of FIG. 2, there are preferably three soft mount devices 58 and three latches to restrain the optical payload 48 in all six degrees of freedom.

Figure 4:
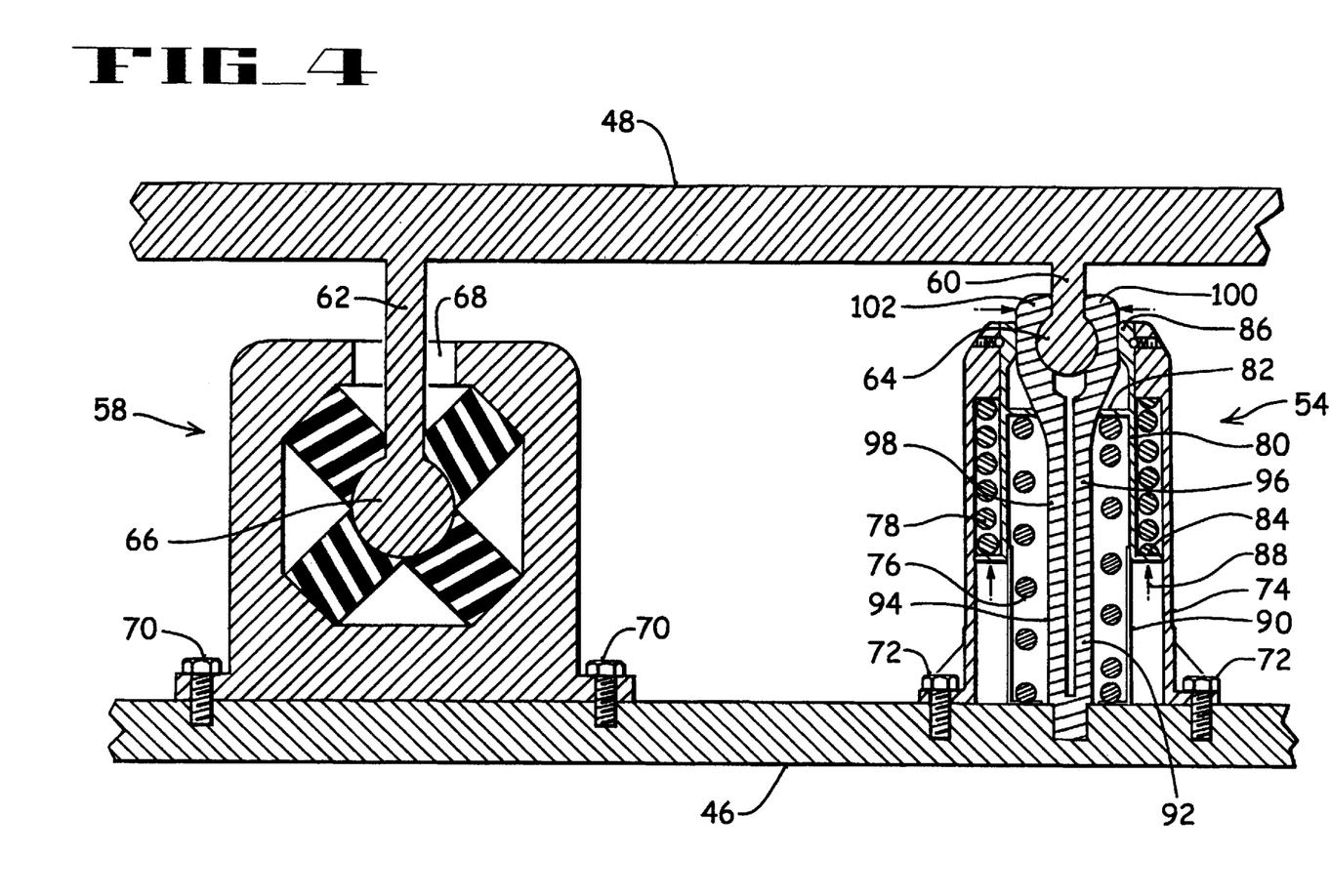
FIG. 4 is a cross sectional view of the apparatus of FIG. 3 used in conjunction with a soft mount device to support a payload, such as the optical paylo ad of FIG. 2.

Referring now to FIG. 4, a single latching apparatus 54 and a single soft mount device 58 are shown as connecting the optical payload 48 to the satellite body 46. A pair of payload interface structures to the device and the apparatus each include a stem 60 and 62 and a spherical end 64 and 66. The spherical end 66 of the payload interface to the soft mount device 58 is free to rotate within the device to the extent allowed by an opening 68 through which the stem 62 extends. Moreover, the spherical end 66 moves laterally or vertically within the soft mount device. Bolts 70 secure the soft mount device 58 to the satellite body 46.

The latching apparatus 54 of FIGS. 3 and 4 is also connected to the satellite body 46 by bolts 72. The apparatus includes a housing 74 that provides a shell for other components of the apparatus. A first, inner shape memory alloy (SMA) coil 76 and a second, outer SMA coil 78 are contained within the housing. As will be explained more fully below, the SMA coils bias an actuator 80 in opposite directions. The actuator includes an inwardly directed annular flange 82, an outwardly directed annular flange 84, and a wedge end 86. The actuator is shown in a lowered position in FIG. 3 and a raised position in FIG. 4. The position of the actuator determines whether the latching apparatus is in an open release condition or a closed capture condition. The actuator is limited to axial motion, as shown by arrows 88 in FIG. 4. As best seen in FIG. 3, the wedge end 86 of the actuator slides along the interior surface of the housing 74. A cylindrical wall 90 is included to maintain the position of the inner SMA coil 76 during operation of the latching apparatus 54.

Axially aligned within the housing 74 is a flexure formed of an array of flexible fingers, with each finger having a lower fixed end 92 and 94, a shank 96 and 98, and a working end 100, 102 and 104. In FIG. 3, only three of the fingers are shown, but the flexure is preferably an array of at least four fingers. The fingers are formed of a material that causes the fingers to separate to the relaxed open condition of FIG. 3, but permits the fingers to flex to the closed condition of FIG. 4. That is, the fingers are biased to cause the working ends 100, 102 and 104 to separate radially when not forced to the closed condition.

Referring specifically to FIG. 3, each working end 100, 102 and 104 of the fingers has a first arcuate contact surface 106 and a second arcuate contact surface 108. When the flexure is in the capture condition, the first arcuate contact surfaces combine to define a substantially cylindrical configuration having a diameter slightly smaller than the diameter of the spherical end 64 of the payload interface structure. One or both of the spherical end and first contact surfaces have a coating of compliant material that compresses to accommodate the difference in diameters. The coating reduces the likelihood that the components will be wedged in place. The second arcuate contact surfaces 108 combine to grasp the stem 60 of the payload interface structure. Again, a compliant coating material is utilized. Consequently, the closed condition of the latching apparatus 54 in FIG. 4 aligns the stem 60 to be coaxial with the apparatus 54. Most importantly, the stem 60 is coaxial with the flexure, so that an impact upon the upper surface of the optical payload 48 or upon the lower surface of the satellite body 46 will not generate a force that acts to shift the apparatus from a closed capture condition to an open release condition, as will be explained more fully below.

The operation of the latching apparatus 54 will be described with reference to FIGS. 5 and 6. In the release condition of FIG. 5, the working ends 100 and 102 of the flexure are spaced apart, freeing the stem 60 and the spherical end 64 of the payload interface structure to move relative to the apparatus 54. While not critical, the contact of the working ends with the inner surface of the housing 74 may limit the radial expansion of the flexure to prevent the spherical end 64 from escaping, even when the flexure is in the release condition of FIG. 5. That is, the spherical end may be free to move to a limited extent in FIG. 5, but is still maintained in a position that allows the apparatus 54 to quickly latch the optical payload 48 into a fixed position of FIG. 6.

Figure 5:
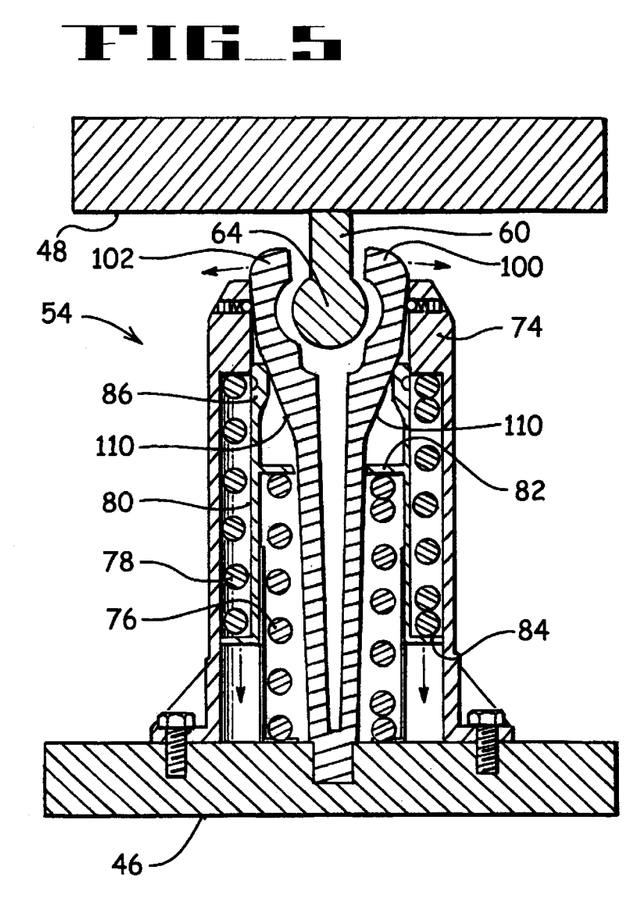
FIG. 5 is a side sectional view of the apparatus of FIG. 3 shown in an open condition.

In the release condition of FIG. 5, the wedge end 86 of the actuator 80 is in contact with tapered bearing surfaces 110 of the fingers of the flexure. Since the bearing surfaces taper downwardly, upward movement of the wedge end will urge the flexure to radially contract, thereby closing the working ends 100 and 102 about the stem 60 and the spherical end 64 of the payload interface structure. The upward movement of the actuator 80 is controlled by heating the inner SMA coil 76. An SMA material is characterized by its change of states when heated above a particular transition temperature. For example, the transition temperature may be 70° Celsius. In the embodiment of FIGS. 5 and 6, the SMA material is one that increases in stiffness when heated to a temperature above its transition temperature. The increase in stiffness may be an order of magnitude. The increase in stiffness is reversible, since cooling the coil to a temperature below its transition temperature causes softening. Referring briefly to FIG. 7, the inner SMA coil 76 is shown as having a resistive wire 112 spiral wound around the coil. The SMA coil may be heated by driving an electrical current through the resistive wire. However, other means for heating the material may be utilized. Cooling the SMA spring 76 may be achieved simply by allowing heat conduction and radiation to disperse the thermal energy. Alternatively, a cooling mechanism, not shown, may be utilized.

If both of the inner and outer SMA coils 76 and 78 are in the cooled, soft state, the forces exerted by the coils upon the actuator 80 are in equilibrium. The contact of the inner SMA coil 76 with the inwardly directed annular flange 82 biases the actuator upwardly. This bias is opposed by the bias of the outward SMA coil 78 upon the actuator by means of contact with the outwardly directed annular flange 84. Consequently, no energy is expended in order to maintain the apparatus 54 in the release condition of FIG. 5.

When the inner SMA coil 76 is heated above its transition temperature, the inner SMA coil exerts a significantly larger force upon the actuator 80 than does the cooled outer SMA coil 78. The wedge end 86 of the actuator rides in bearing engagement with the tapered bearing surfaces 110 of the fingers of the flexure and eventually reaches the raised position shown in FIG. 6. The wedge end forces the working ends 100 and 102 of the fingers radially inwardly until the stem 60 and the spherical end 64 of the payload interface structure are firmly latched in position.

Figure 6:
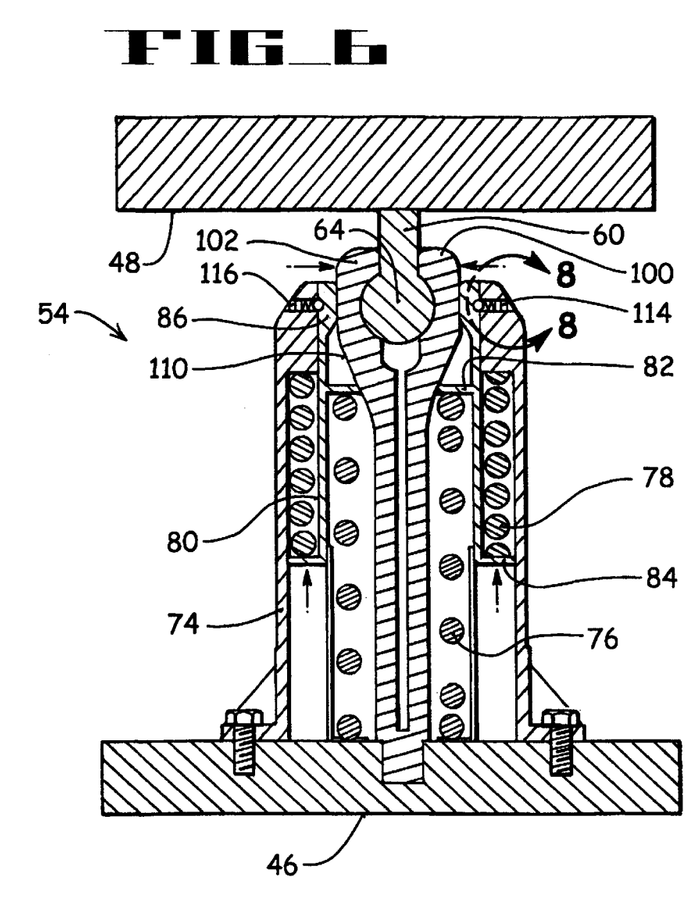
FIG. 6 is a side section al view of the apparatus of FIG. 3 shown in a closed condition.
Figure 7:
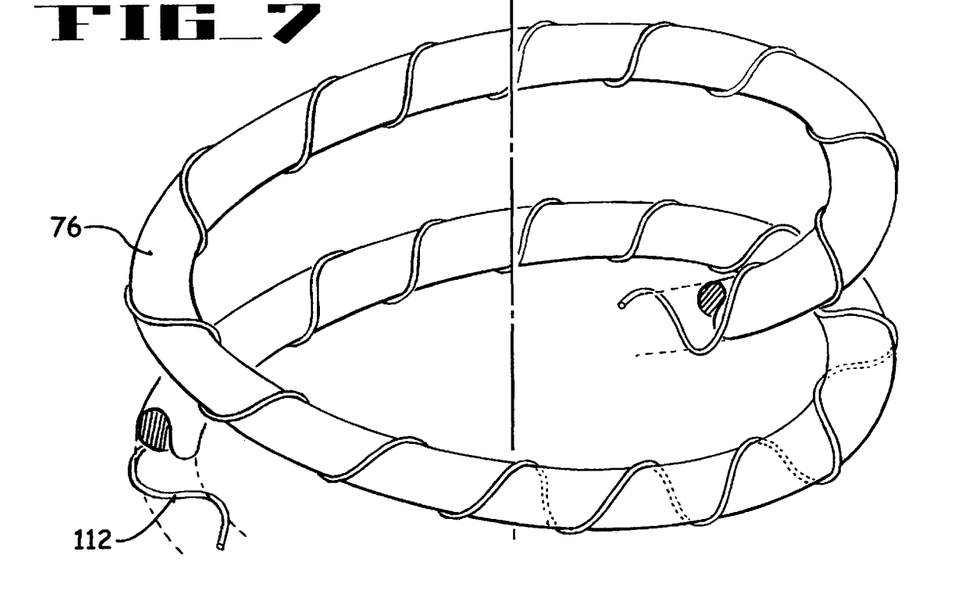
FIG. 7 is a perspective view of a portion of a shaped memory alloy coil of FIGS. 3–6.
Figure 8:
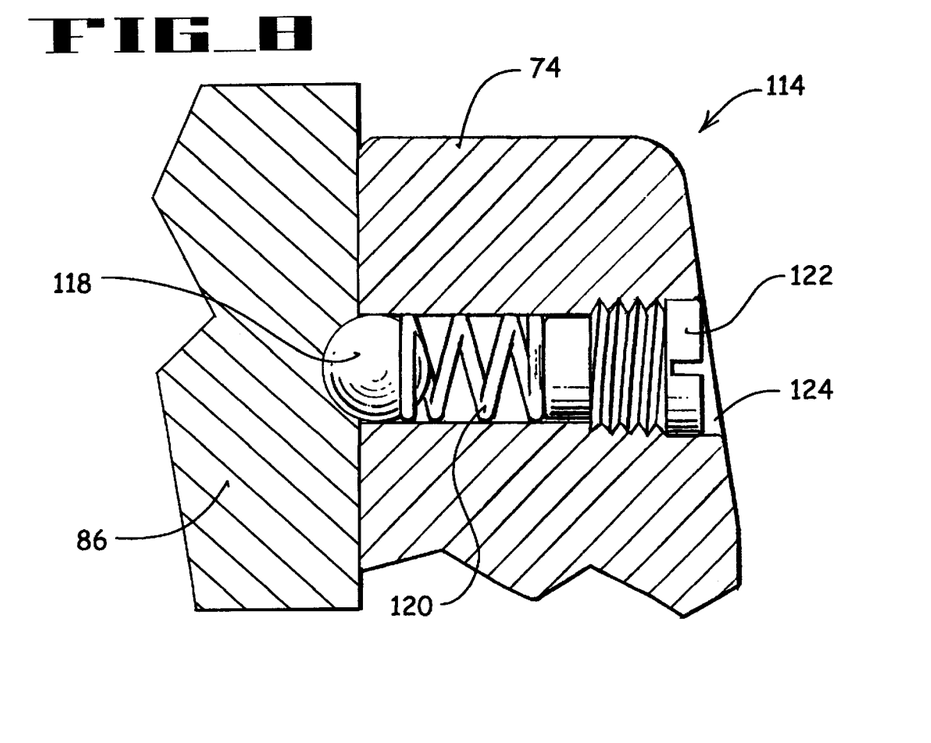
FIG. 8 is a side sectional view of a detent-and-ball arrangement for securing the apparatus in the closed condition of FIG. 6.

In the preferred embodiment, maintaining the latched state of FIG. 6 does not require the inner SMA coil 76 to remain above its transition temperature. Instead, a mechanism for securing the latching apparatus 54 in the latch state is preferably included. After the inner SMA coil 76 is cooled by conduction and radiation, it is again soft. The outer SMA coil 78 is also cold, but is highly compressed and exerts a downward force on the actuator 80 that is greater than the upward force exerted by the now cooled inner SMA coil. The downward force, however, is not as great as a combination of the force of the inner SMA coil and the retaining force provided by at least one detent-and-ball arrangement 114 and 116. The arrangement can be seen most clearly in FIG. 8. The wedge end 86 of the actuator includes a detent that is configured to receive a portion of a ball 118. The ball is biased into the detent by a spring 120. The force of the spring 120 upon the ball 118 is adjustable by means of rotating a setscrew 122 within an internally threaded bore 124 through the housing 74. The wedge end 86 of the actuator is thereby maintained in the position shown in FIG. 6 after the inner SMA coil 76 is cooled. To return the apparatus 54 to the release condition of FIG. 5, the outer SMA coil 78 is heated above its transition temperature. The force developed by the highly compressed outer SMA coil may increase by an order of magnitude as the SMA material stiffens. The enhanced force is sufficiently large to dislodge the wedge end 86 of the actuator from the one or more detent-and-ball arrangements. The outer SMA coil can then be cooled, allowing the two SMA coils 76 and 78 to return the actuator 80 to the equilibrium position shown in FIG. 5.

As previously noted, an advantage of the preferred embodiment of FIGS. 2–6 is that the apparatus 54 has a low susceptibility to inadvertently being shifted between the latched and unlatched conditions. In the latch state of FIG. 6, the payload interface structure and the flexure are coaxially aligned. Moreover, the inner surface of the housing 74, the inner and outer surfaces of the wedge end 86, and the outer surfaces of the working ends 100 and 102 of the flexure are all parallel to each other. Consequently, any external or inertial force acting on the payload is reacted either axially in the flexure or normally to the inner and outer surfaces of the wedge end. The reacted forces therefore do not have any component that would tend to drive the wedge back into the release position of FIG. 5. This allows the apparatus 54 to be particularly useful in high load applications.

While not shown in the illustrations, the outer surface of the payload interface structure or the inner surfaces of the working ends of the flexure preferably have a thin coating of a relatively compliant material. The coating reduces the likelihood that the apparatus will stick in the latch state because of a wedging effect.

Referring briefly to FIG. 6, in the preferred embodiment, the contact of the inwardly directed annular flange 82 of the actuator 80 against the tapered bearing surfaces 110 of the flexure acts as a stop to limit the upward stroke of the actuator. This prevents the wedge end 86 of the actuator from being overdriven.

The invention has been described and illustrated as being used in the space industry. However, this is not critical. The apparatus may be used to provide a latching action in applications outside of the space industry. However, the low-mass, programmable and resettable apparatus is particularly useful within the space industry.

What is claimed is:

1. An apparatus for selectively capturing an object of interest comprising:

an expandable latch having a plurality of flexible fingers and having a relaxed open condition and a flexed capture condition;

an actuator movable between first and second positions, said actuator being disposed relative to said expandable latch such that movement of said actuator shifts said expandable latch between said open and capture conditions; and a pair of shape memory alloy (SMA) members arranged to positively pressure said actuator in opposite directions, said pair including a first SMA member pressing said actuator into said first position and including a second SMA member pressing said actuator into said second position.

2. The apparatus of claim 1 wherein each of said SMA members is a coil spring and has a heated stiff state and a cooled soft state, said first position of said actuator being determined by an equilibrium condition in which forces exerted by said SMA members on said actuator are in balance when both of said SMA members are in said cooled soft state.

3. The apparatus of claim 2 further comprising means for releasably holding said actuator in said second position at a force less than the force exerted on said actuator when said first SMA member is sufficiently heated to transition from said soft state to said stiff state.

4. The apparatus of claim 3 wherein said means for releasably holding said actuator includes a detent-and-ball arrangement.

5. The apparatus of claim 1 wherein said expandable latch is a flexure having an axis and having a radially expanded open condition and a radially contracted closed condition, said flexure having a relaxed state in which said flexure rests in said radially expanded open condition.

6. The apparatus of claim 5 wherein said fingers have latching ends, said latching ends being radially spaced apart when said flexure is in said relaxed state.

7. The apparatus of claim 5 wherein said flexure has a tapered bearing surface in contact with said actuator, said flexure and said actuator being generally coaxial, said actuator being axially movable between said first and second positions while in contact with said tapered bearing surface.

8. The apparatus of claim 7 wherein said SMA members are coiled and generally coaxial with said flexure and actuator, said SMA members encircling said flexure, a first one of said SMA members encircling a second one of said SMA members.

9. The apparatus of claim 7 wherein one of said tapered bearing surface and said actuator has a coating of compliant material.

10. The apparatus of claim 1 wherein said expandible latch has an inner contact surface that defines a generally spherical configuration when said expandible latch is in said closed condition.

11. A latching apparatus comprising:
   a flexure having a relaxed open condition and flexed capture condition, said flexure having a bearing surface and a contact surface for contacting and securing an object of interest;
   an actuator in contact with said bearing surface of said flexure;
   first means for selectively exerting a force on said actuator to induce relative movement between said actuator and said bearing surface in a first direction such that said flexure is forced into said relaxed open condition; and
   second means for selectively exerting a force on said actuator to induce relative movement between said actuator and said bearing surface in a second direction such that said flexure is forced into said flexed capture condition;
   each of said first and second means including a coil of a shape memory material associated with a transition temperature, each said coil having a length dependent upon the temperature of said coil relative to said transition temperature.

12. The apparatus of claim 11 wherein coils of said first and second means are coupled to said actuator to exert constant pressure on said actuator in opposite directions.

13. The apparatus of claim 11 wherein said bearing surface of said flexure is tapered and said actuator is movable between first and second positions.

14. The apparatus of claim 11 wherein said contact surface of said flexure is generally spherical when said flexure is in said flexed capture condition, said flexure being an array of fingers connected at stationary ends, each finger having a free end with an inner arcuate surface defining a portion of said contact surface.

15. The apparatus of claim 11 further comprising a detent-and-ball arrangement supporting said actuator in a position relative to said bearing surface of said flexure to retain said flexure in said flexed capture condition.

16. The apparatus of claim 15 wherein said detent-and-ball arrangement exerts a retaining force less than a force exerted by said coil upon varying the temperature of said coil through said transition temperature.

17. A support system for a payload comprising:
   a payload interface structure;
   soft mount means for supporting said payload while allowing freedom of movement; and
   a controllable apparatus including:
      (a) a flexure having a plurality of fingers, said flexure being self-biased in an open condition, said flexure having a closed condition, said payload interface structure being positioned and configured such that said flexure captures said payload interface structure when in said closed condition;
      (b) a movable actuator in bearing engagement with said flexure, said bearing engagement having a contour selected to cause said flexure to shift between said open and closed conditions with movement of said actuator;
      (c) a pair of temperature-responsive coils, with a first temperature-responsive coil positioned to exert a positive pressure on said actuator to close said flexure and a second temperature-responsive coil positioned to exert a positive pressure on said actuator to open said flexure, shifting of said flexure between said open and closed positions being dependent upon changes in temperature of said temperature-dependent coils; and
      (d) means for releasably retaining said flexure in said open condition.

18. The system of claim 17 wherein said temperature-responsive coils are formed of a shape memory alloy and are coupled to said actuator to press said actuator in opposite directions.

19. The system of claim 17 wherein said soft mount means and said controllable apparatus are connected to a spacecraft.

20. The system of claim 17 wherein said flexure and payload interface structure are configured such that said payload interface structure remains confined when said flexure is in said open condition, while having freedom of movement within said confinement.

* * * * *